(12) United States Patent
Chambers et al.

(10) Patent No.: US 6,292,755 B2
(45) Date of Patent: Sep. 18, 2001

(54) 3-D SEISMIC TRACE EXTRAPOLATION AND INTERPOLATION

(75) Inventors: Ronald Edward Chambers, Houston; Necati Gulunay, Missouri City, both of TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/754,135

(22) Filed: Jan. 3, 2001

Related U.S. Application Data

(63) Continuation of application No. 09/337,116, filed on Jun. 21, 1999, now abandoned.

(51) Int. Cl.[7] .................................................. G01V 1/28
(52) U.S. Cl. .................................................................. 702/17
(58) Field of Search ................................... 702/14, 16, 17, 702/18; 367/45, 43, 73

(56) References Cited

U.S. PATENT DOCUMENTS

| | | |
|---|---|---|
| 4,594,693 | 6/1986 | Pann et al. . |
| 4,672,545 | 6/1987 | Lin et al. . |
| 4,866,659 | 9/1989 | Lin et al. . |
| 4,887,244 | 12/1989 | Willis et al. . |
| 5,617,372 | 4/1997 | Gulunay et al. . |
| 5,742,560 | 4/1998 | Krebs . |
| 5,850,622 | 12/1998 | Vassiliou et al. . |
| 6,021,379 | 2/2000 | Duren et al. . |

FOREIGN PATENT DOCUMENTS

| | | |
|---|---|---|
| 0 551 210 A2 | 8/1993 | (EP) . |
| 2 320 758 A | 1/1998 | (GB) . |

*Primary Examiner*—Donald E. McElheny, Jr.
(74) *Attorney, Agent, or Firm*—Madan, Mossman & Sriram, P.C.

(57) ABSTRACT

Lines of existing data are extrapolated to provide additional lines of seismic data by using small inline gates of existing cables. At each frequency slice of a space gate on the existing cables, a 2-D prediction error filter that can predict the data in forward and backward directions is designed. A prediction filter is obtained from the prediction error filter and applied to a cable at an edge of the space gate to predict a first missing cable. By repeating this process using overlapping inline gates, overlapping inline gates of the extrapolated cables may be obtained. By suitable weighting of the inline gates of the extrapolated cables, a complete cable length is extrapolated. The process may be repeated using the first extrapolated cable in the derivation to give additional extrapolated cables. The invention may be used for interpolating cables of dealiased cables between existing cables using a masking and filtering operation in the frequency-wave number domain. In an alternate embodiment, existing lines of seismic data are sorted to give a crossline sort. The crossline sorted data are interpolated in the frequency-wave number domain to provide interpolated data between the lines of existing swaths of 3-D seismic data.

13 Claims, 5 Drawing Sheets

3-D SEISMIC TRACE EXTRAPOLATION AND INTERPOLATION

CROSS REFERENCES TO RELATED APPLICATIONS

This application is a continuation of U.S. patent application Ser. No. 09/337,116 filed on Jun. 21, 1999 now abandoned.

BACKGROUND OF THE INVENTION

1. Field of the Invention

This invention relates to the field of seismic data acquisition and processing. More particularly, this invention relates to a method of using 2-dimensional extrapolation techniques for predicting lines of seismic data beyond existing lines of seismic data and interpolating lines of seismic data between existing lines of seismic data.

2. Background of the Art

3-D marine seismic surveys entail towing a swath of elongated seismic sensor arrays. The swaths are repeated to increase the amount of coverage in a direction transverse to the direction of the sensor arrays. In order to reduce the cost of acquisition, it is desirable to avoid overlap of successive swaths and, if possible, not leave gaps between the successive swaths.

The present invention may be applied to any form of seismic operation, be it on land or on sea. However for convenience, by way of example but not by way of limitation, this disclosure will be explained in terms of a marine seismic survey.

In 3-D marine operations, a seismic ship tows a swath including a plurality of parallel seismic streamer cables along a desired line of survey, the cables being submerged by a few meters beneath the water surface. The number of cables that make up a swath depends only on the mechanical and operational capabilities of the towing ship. There may be six or more such cables, spaced about 50 to 100 meters apart. The respective cables may be up to 8 to 12 km. long.

Each streamer cable typically includes 120 or more spaced-apart seismic detector groups. Each group consists of one or more individual interconnected detectors, each of which services a single data channel. The group spacing is on the order of 25 to 50 meters longitudinally along the cable. The seismic detectors are transducers that perceive the mechanical activity due to reflected acoustic wavefields and convert that activity to electrical signals having characteristics representative of the intensity, timing and polarity of the acoustic activity as is well known to the art. The detectors are operatively coupled to data-storage and processing devices of any desired type.

An acoustic source such as an array of air guns, is towed in the water by the ship near the leading end of the swath of seismic streamer cables. As the ship proceeds along the line of survey, the source is fired (activated) at selected spatial intervals, commonly equal to the group interval. Assuming the ship travels at a constant velocity such as 4–6 knots, the source may be conveniently fired at selected time intervals such as every 5–13 seconds or more. The wavefield emitted by the source, travels downwardly to be reflected from subsea earth formations whence the wavefield is reflected back to the water surface where the reflected wavefield is received by the detectors and converted to electrical signals. The detected electrical signals are transmitted to any well-known signal recording and processing means for providing a physical model of the subsurface.

FIG. 1 is a plan view of a 3-D seismic survey acquisition. A first 3-D swath 13 of six parallel seismic cable arrays A1–A6 are towed through a body of water by a ship 14. The cables are typically configured to be a distance d apart. It should be understood that six cables are shown only as an example, and a greater or lesser number of cables could be used in the acquisition. It should be further understood that, if land operations are under consideration, the cables could be towed by one or more trucks or could be laid out by cable trucks using roll-along techniques in a manner well-known to the seismic industry. Signals from the respective cable arrays A1–A6 are fed over a data-signal manifold 20 to a processor 22 of any well-known type, installed on ship 14 and operatively coupled to the processor 22 by electrical lead-ins 16 and 18. A discrete acoustic source SL is towed by ship 14 near the leading end of swath 13, substantially at the center of the swath. More than one discrete source such as SL' and SL", offset from the center line may be used if desired.

A second 3-D swath 13' of six parallel seismic cable arrays A1'–A6' may be obtained by towing the cables at a position that is laterally offset from the first swath 13.

This may be done by a ship 14'. It should be understood that the second swath could be obtained at a later time than the first swath, so that the ship 14' could be the same as the ship 14, or it could be acquired simultaneously with the acquisition of the first swath 13 using a second ship. Without limitation, the invention is discussed herein as if the difference swaths are acquired at different times using the same ship.

Those versed in the art would recognize that in order to minimize the cost of seismic data acquisition, the distance D between the two swaths 13 and 13' should, at the very least, be the same as the distance d between the cables. If this is not done, there will be unnecessary duplication of data. Those versed in the art would also recognize that if the distance D is greater than the distance d, data acquisition costs could be reduced if the data within the gap between the swaths could be filled in by simulating data that would be acquired by cables within the gap. The term "gap" here is not limited to spatial gaps in the acquisition geometry and is particularly intended to include a gap in the illumination of the subsurface by the seismic acquisition. The term "insonification" has sometimes been used to describe illumination by sound waves. The quality of a processed image that is based partially on such simulated data depends upon how the simulation is done. Even if only one swath of data is acquired, it would be desirable to simulate additional cables of data that are simply extrapolated away from an existing swath of data. Another problem that is encountered in 3-D seismic data acquisition is that of aliasing, wherein due to inadequate sampling of data, certain frequencies and/or dips in the subsurface cannot be properly imaged. Interpolation of data between existing cables is one possible solution to the problem. The present invention addresses the need for such extrapolation and interpolation of cables of seismic data.

SUMMARY OF THE INVENTION

The present invention is a method for extrapolating cables of seismic data by using small inline gates of existing cables. At each frequency slice of a space gate, a 2-D prediction error filter that can predict the data in forward and backward directions is designed. A prediction filter is obtained from the prediction error filter and applied to a cable at an edge of the space gate to predict a first missing cable. By repeating this process using overlapping inline gates, overlapping inline gates of the extrapolated cables may be obtained. By suitable weighting of the inline gates of the extrapolated cables, a complete cable length is extrapolated. The process may be repeated using the first extrapolated cable in the derivation to give additional extrapolated cables. A similar prediction process is used to interpolate missing cables between existing swaths of 3-D seismic data.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Figure 1:
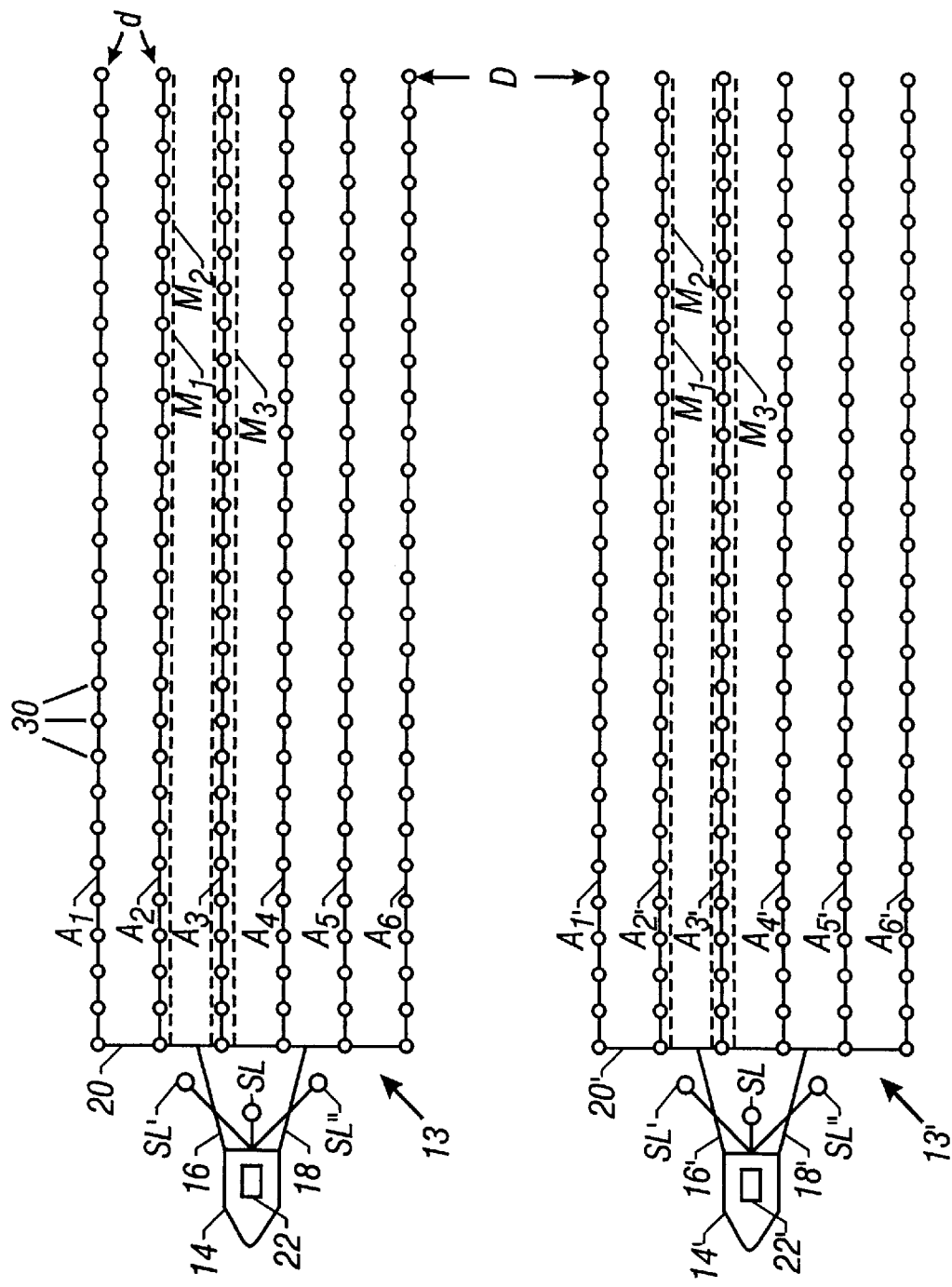
FIG. 1 is a schematic illustration of a marine seismic data acquisition illustrating two swaths of 3-D acquisition.
Figure 2A:
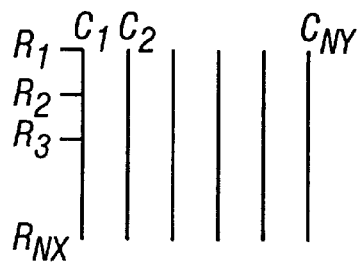
FIGS. 2A, 2B show the extrapolation of cables from an existing set of seismic cables.

Referring now to FIG. 2A, a schematic illustration of a portion of locations on a 3-D seismic acquisition survey are shown. A plurality of seismic lines $C_1, C_2, C_3 \ldots C_{ny}$ are shown and a plurality of seismic receiver locations $R_1, R_2, R_3 \ldots R_{nx}$ on each of the plurality of seismic lines are indicated. For simplifying the illustration, the receiver locations are indicated only one cable. As discussed in the background above, the plurality of seismic lines in a conventional marine seismic survey are comprised of cables connecting the receivers. However, the present invention includes seismic surveys in which the survey may be carried out on land, or surveys in which the receivers along seismic lines transmit received data by telemetry. For convenience, in the following discussion, the term "cable" is used to encompass all of these arrangements of seismic lines having receivers along them.

Figure 2B:
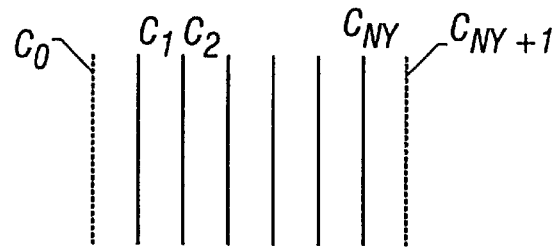

The plurality of cables $C_1, C_2, C_3 \ldots C_{ny}$ and the plurality of receivers $R_1, R_2, R_3 \ldots R_{nx}$ define a spatial gate of size $n_x \times n_y$ locations in the x- and y-directions. The number $n_x$ of receiver locations in the cable used in the gate will, in general, be less than the number of available data channels on the cable: the latter number is typically 120 or more. Using an extrapolation method using a prediction filter described below with reference to FIG. 4, this spatial gate of $n_x \times n_y$ locations may be used to define a gate of length $n_x$ of an extrapolated cable denoted by $C_{ny+1}$ as indicated in FIG. 2B. Using a conjugate flipped version of the prediction filter, a cable denoted by $C_0$ as indicated in FIG. 2B may also be obtained, i.e., the extrapolated cable may be on either side of the existing plurality of cables $C_1, C_2, C_3 \ldots C_{ny}$.

Figure 3:
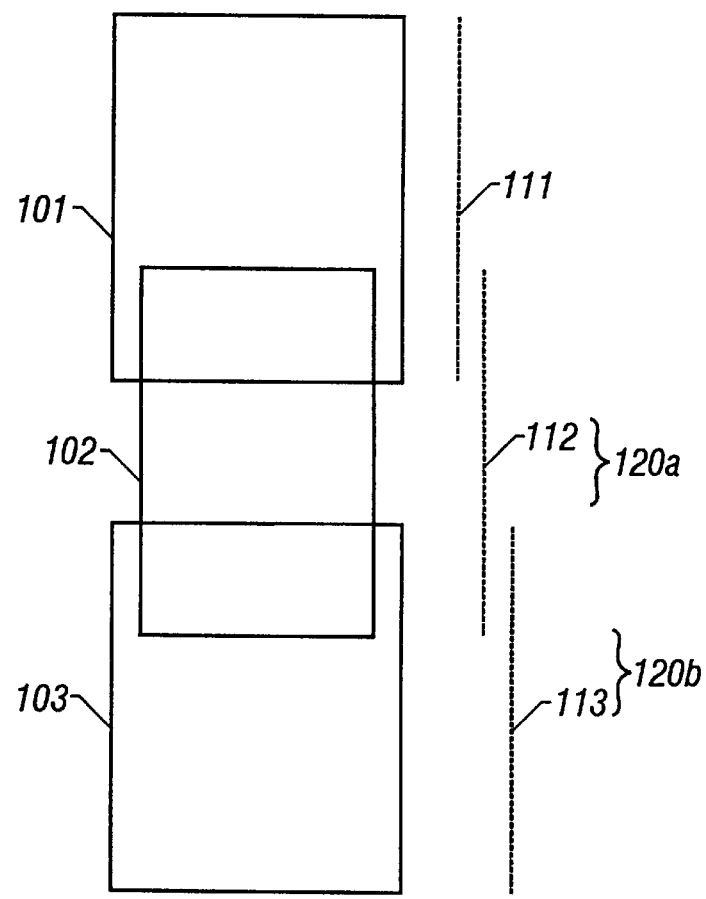
FIG. 3 illustrates the use of overlapping spatial gates to obtain an extrapolated cable.

Turning now to FIG. 3, a number of overlapping spatial gates 101, 102 and 103 are shown. Each of the gates is $n_x$ in length, and $n_y$ wide, as in FIGS. 2A and 2B above. Using data from gate 101, a gate of length $n_x$ is obtained on an extrapolated cable as discussed above. This extrapolated gate is denoted by 111. Similarly, the gates 102 and 103 on the spatial gates are used to produce extrapolated gates 112 and 113. This is continued for the entire length of the cables (not shown) to produce extrapolated gates that span the length of the cables.

As seen on FIG. 3, there is a region of overlap 120a between the extrapolated gates 111 and 112, and a region of overlap 120b between the extrapolated gates 112 and 113. Using known methods, the data in the extrapolated cable within the overlap regions 120a and 120b may be combined, and by repeating the process for any additional gates, an entire cable of data may be extrapolated. In a preferred embodiment of the invention, a tapered weighting function is applied to the data with 111 and 112 in the overlap zone 120a and the weighted extrapolated data from 111 and 112 summed. Commonly used tapering techniques, as would be known to those versed in the art, include a linear tapering or a cosine function.

As noted above, the number of receivers in a survey is 120 or more, with six being a typical number for the plurality of cables $n_y$. In a preferred embodiment of the invention, the extrapolation to an additional cable is done by applying a prediction filter to the received seismic data on the $n_y$ cables. The space gate discussed above with reference to FIG. 3 has a length $n_x$ that is preferably ten or more receiver group intervals. The prediction filter is derived within each space gate as described below with reference to FIGS. 4–6.

Figure 4:
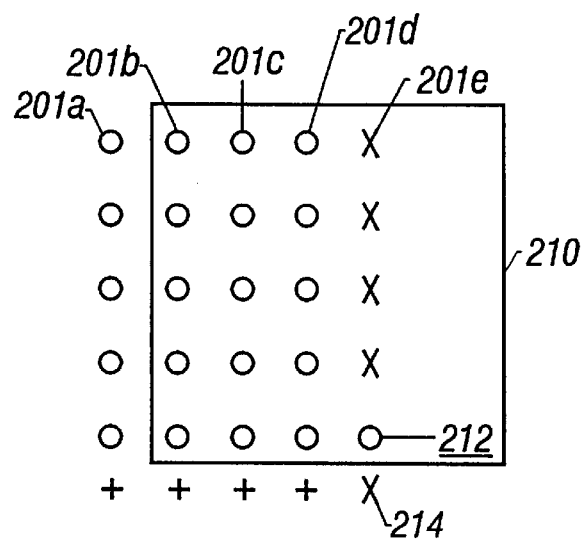
FIG. 4 shows the application of a prediction filter to obtain data locations on an extrapolated cable.

FIG. 4 shows the manner in which points on an extrapolated cable are obtained when a prediction filter has been derived as discussed below. Shown by dots are a plurality of receiver locations on existing cables 201a, 201b, 201c and 201d. For illustrative purposes only, the prediction filter is a 5×4 filter for extrapolating data. The prediction filter uses data from the existing cables within the 5×4 box denoted by 210. This data includes previously determined points denoted by x's along an extrapolated cable 201e. Application of the 5×4 filter to the data within the box 210 gives an output trace at location 212 denoted by the open circle. The process is then repeated moving the box 210 in the x-direction by one trace, using the data traces denoted by +'s on the existing cables and the trace at location 212 to give a new output trace at location 214. This process is repeated for all traces within a spatial gate as defined above in the discussion of FIG. 3. Those versed in the art would recognize the existence of an "end effect" at the beginning of the extrapolation process in generating the first few traces on an extrapolated cable.

The process discussed above in reference to FIG. 4 may be repeated using an extrapolated cable as part of the input to provide second and additional extrapolated cables of predicted seismic data.

Extrapolation of cable data in the other side of existing data, i.e., to the left in FIG. 4 is done by using a filter that is the flipped and complex conjugate of the filter used for extrapolation to the right.

The design of a 2-D filter is discussed with reference to FIGS. 5A and 5B. Shown is a space gate of size $n_x \times n_y$. Each point in the space gate is a trace of seismic data defining a volume in the (x, y, t) space. In a preferred embodiment of the invention, the data are Fourier transformed in time, giving a data volume in (x, y, ω) space, where ω is the angular frequency $2\pi f$. A separate filter is derived for each frequency $f$, or equivalently, ω.

Figure 5A:
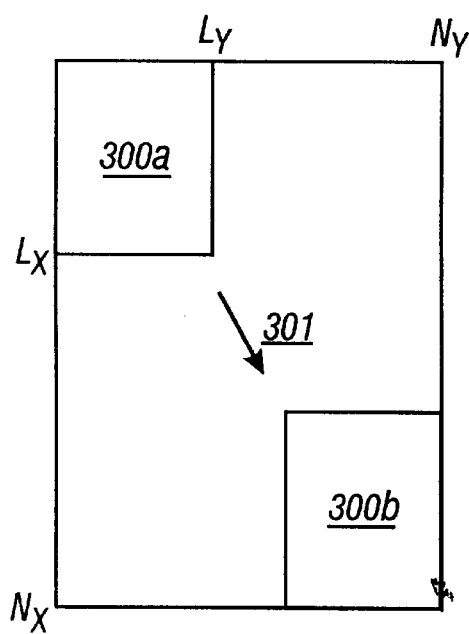
FIGS. 5A, 5B show the derivation of a 2-D prediction filter.
Figure 5B:
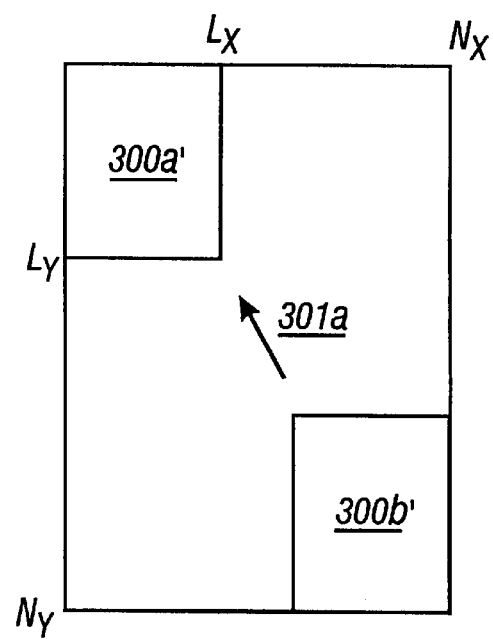

Referring now to FIG. 5A, a region of size $l_x \times l_y$ denoted by 300a shows the size of the filter. The design of a two dimensional prediction error filter of size $l_x \times l_y$ over a two dimensional space gate of size $n_x \times n_y$, is done by writing down the convolutional equation equations stating that the forward prediction filter annihilates data points from $(l_x, l_y)$ to point $(n_x, n_y)$ as denoted by the arrow 301 in FIG. 5A. Similarly, the conjugate flipped version of the same filter can annihilate data in the reverse direction from the point $(n_x-l_x+1, n_y-l_y+1)$ to the point (1,1) as indicated by the arrow 301a in FIG. 5B.

Denoting the prediction error filter e by $$e = [E_{1,1}, E_{2,1}, \ldots E_{lx,1}, E_{1,2}, E_{2,2}, \ldots E_{lx,2}, \ldots E_{1,ly}, E_{2,ly}, \ldots E_{lx,ly}]^T \quad (1)$$

where the $[\ ]^T$ denotes the transpose, the filter equation is written in the form Xe=n where e is the prediction error filter, a vector of length $l_x l_y$, X is a data matrix of size $2(n_x-l_x+1)(n_y-l_y+1)$ by $l_x l_y$, and n is a noise vector of length $2(n_x-l_x+1)(n_y-l_y+1)$.

The prediction error filter e is solved using the criterion that the noise vector and the signal can only correlate at lag 0, i.e., $$X^{T*}Xe = [1, 0, 0, 0 \ldots 0]^T \quad (2)$$

where the * stands for complex conjugate. The matrix $X^{T*}X$ is a square matrix of dimension $l_x l_y$. Equation (2) is solved for the filter coefficients e. A necessary condition for equation (2) to have a unique solution is that the number of equations given by equation (1) must be larger than the number of unknowns, i.e., $$2(n_x-l_x+1)(n_y-l_y+1) > l_x l_y.$$

Those versed in the art would recognize that the embodiment described above for the filter derivation is free of edge effects, i.e., the filter is designed without running off the edges of the space window. The autocorrelation resulting from this kind of design is called a non-windowed autocorrelation. This method is also referred to as a modified covariance method. The method makes no assumptions about data that is outside the space gate used in the filter derivation. In an alternate embodiment of the invention, a so-called windowed autocorrelation may be used. Such a windowed autocorrelation gives a filter that is less sensitive to prewhitening noise than the non-windowed method, i.e., it is more robust filter. However, a non-windowed autocorrelation is more effective at prediction than the windowed approach. The description above of the derivation and application of the 2-D filter is for exemplary purposes only and other methods known to those versed in the art could be used for the filter derivation and application.

Figure 6:
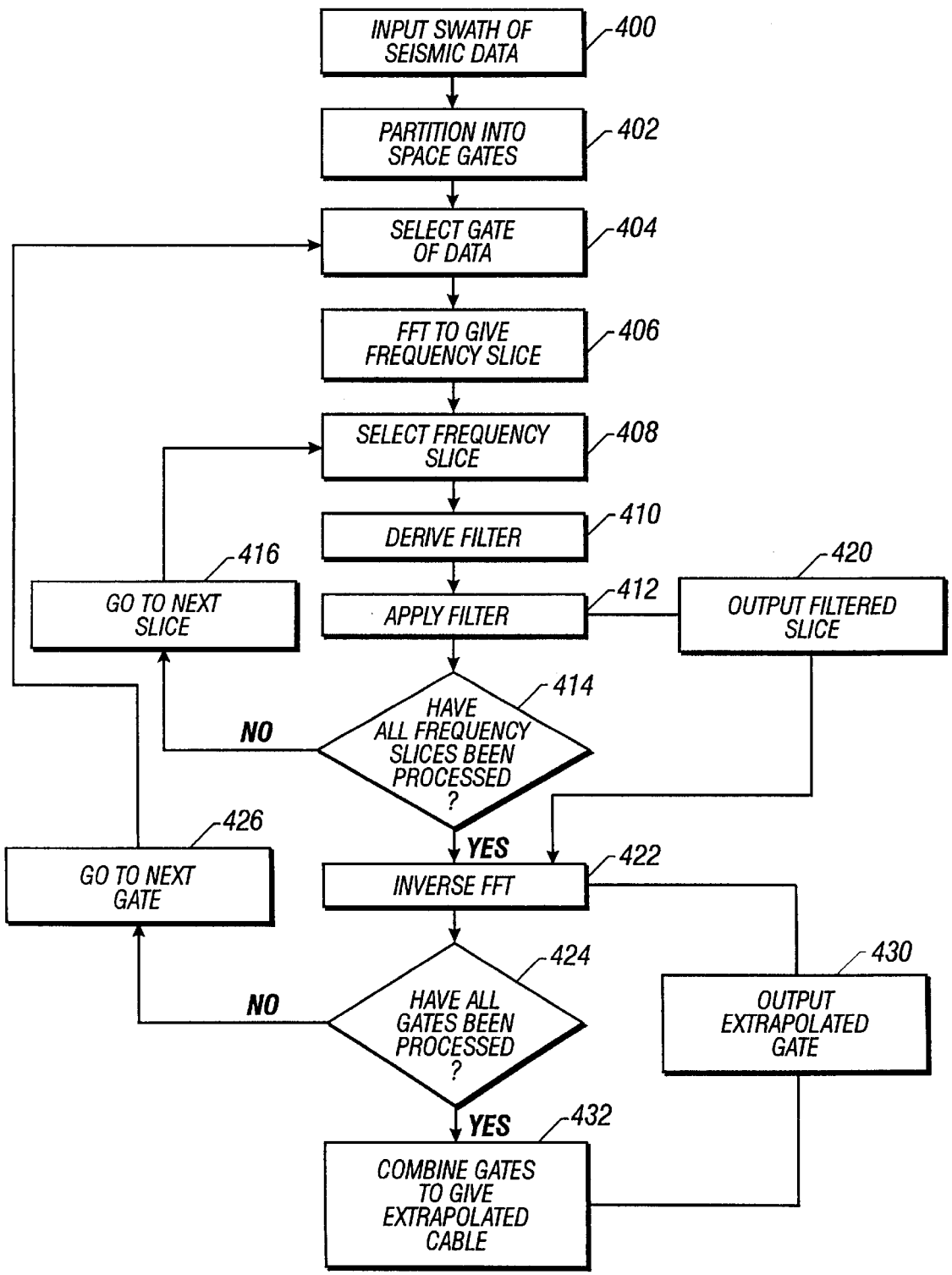
FIG. 6 is a flow chart of some of the steps of the present invention.

FIG. 6 gives a flow chart illustrating the major steps of the present invention. An input swath of seismic data 400 comprising a plurality of cables is partitioned into spatial gates as discussed above with reference to FIG. 3. An initial gate of data is selected for processing 404. The data are transformed from the (x, y, t) domain to the (x, y, ω) domain by using a method such as a Fast Fourier Transform (FFT). This gives a number of frequency slices over a range of frequencies 406 for the selected space gate 404. A frequency slice is selected 408 for filter derivation as discussed above with reference to FIG. 5. The filter is applied 412 and a frequency slice is output 420. A check is made to see if all the frequency slices have been processed 414. If not, 416, processing proceeds to the next frequency slice 416 and back to 408. If the check at 414 indicates that all frequency slices have been processed, then the output filtered slices 420 are inverse Fourier transformed 422 to give an output gate on an extrapolated trace 430. A check is made to see if all the space gates been processed 424. If not, the processing proceeds to the next gate 426 and back to 404. If all the gates have been processed, then the output extrapolated gates are combined as discussed above with reference to FIG. 3. It is to be understood that the processing described in FIG. 6 is equally applicable to the extrapolation of cables in either direction, as discussed above.

The present invention may also be used, with slight modification, to the problem of interpolating cables at locations intertwined within a swath of existing cables. In a preferred embodiment of the present invention, the method described in U.S. Pat. No. 5,677,892 (the '892 patent) issued to the same inventors and having the same assignee is used. The '892 patent, the contents of which are fully incorporated here by reference, deals with the problem of unaliased spatial trace interpolation in the F-K domain of a 3-D volume of data. The traces along the plurality of seismic cables are used to define a 3-D data volume wherein the first spatial coordinate is the receiver position and the second spatial coordinate is the cable number. To obtain the dealiased (interpolated) data set, L-1 zero terms are inserted in each direction (x and y) and an interpolation filter that will fill in these dead traces is sought. Such a filter is designed from (1/L)th lower temporal frequencies of the "zero padded" and "aero padded, zero-masked" versions of the original data. In the context of the present invention, the input 3-D data volume comprises a plurality of cables (the y-coordinate of the data volume of the '892 patent), each of the cables having a plurality of traces (the x-coordinate of the data volume of the '892 patent). The end result of applying the method of the '892 patent is to produce interpolated cables in which receivers are also interpolated. The present invention discards the interpolated receiver positions along the original and interpolated cables to produce a set of interpolated cables having the same receiver spacing as in the original cables.

An alternate embodiment of the present invention uses a modification of the method of U.S. Pat. No. 5,617,372 (the '372 patent) issued to the same inventors as the present application and having the same assignee, teaches a method of interpolation of seismic traces within a single cable. The contents of the '372 patent are fully incorporated herein by reference and the method therein is used to interpolate cables between existing cables of seismic data.

Figure 7:
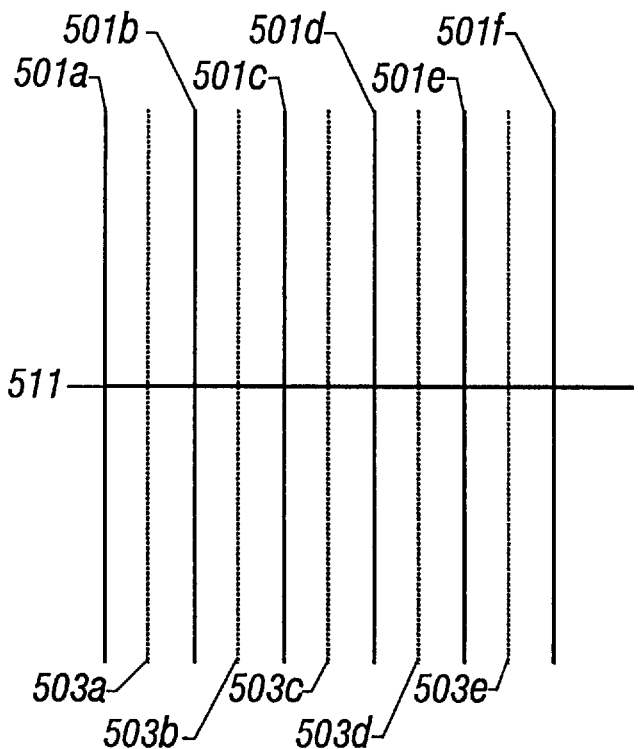
FIG. 7 shows the interpolation of cables within an existing swath of a seismic survey.

This is illustrated in FIG. 7 wherein six cables of data 501a, 501b, 501c, 501d, 501e and 501f are shown. In an alternated embodiment of the present invention, additional cables of data 503a, 503b, 503c, 503d and 503e are obtained by a process of interpolation of data from the existing cables.

Figure 8:
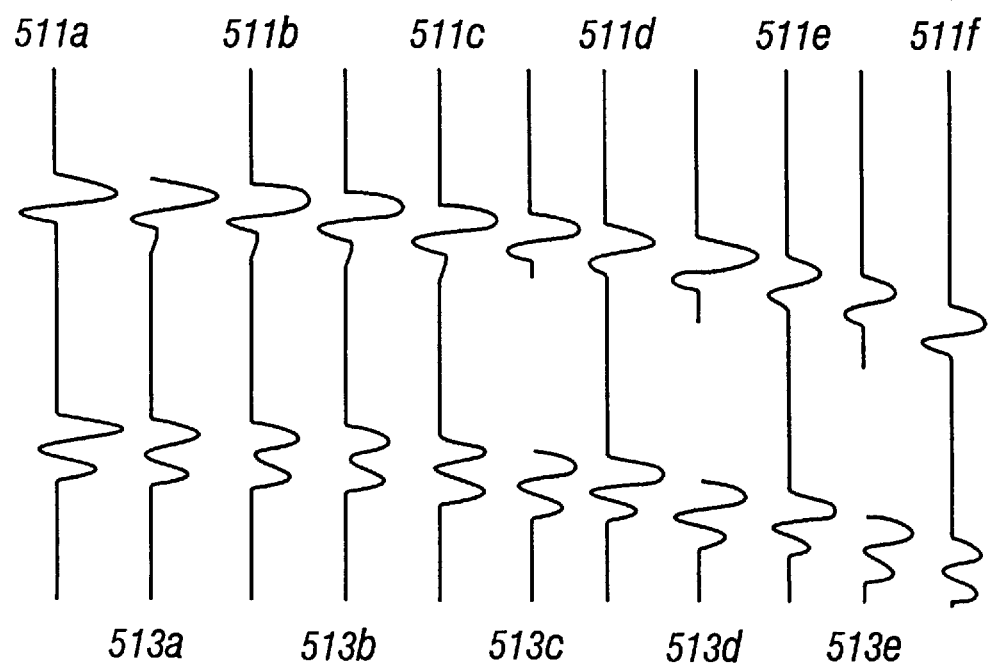
FIG. 8 shows the interpolation of individual traces at a receiver location from traces on an existing seismic swath.

The method of obtaining a single trace on an interpolated cable is discussed with reference to a receiver station 511 on the swath of data. Referring now to FIG. 8, the seismic traces at position 511 on the six cables 501a . . . 501f are denoted by 511a . . . 511f. The vertical axis in FIG. 8 is time. Using the method of the '372 patent, additional traces are interpolated at locations between the locations on the existing cable to give traces 513a . . . 513e. The method of the '372 patent comprises a transformation of the data from the space-time coordinates (y and t in the present context) to frequency-wavenumber coordinates ($k_y$ and ω in the present context), with the interpolation being done in the transformed domain. This is followed by a transformation back to the space-time domain.

This interpolation process is then repeated for other station locations on the existing swath, making it possible to produce entire cables of interpolated data 503a . . . 503e.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of seismic prospecting comprising:
   (a) activating a seismic source to propagate seismic waves into the earths subsurface;
   (b) receiving reflections of the propagating seismic waves from at least one reflecting interface in the subsurface along a plurality of receiver lines, each receiver line including a plurality of seismic receivers, to give received seismic data along the plurality of receiver lines; and
   (c) processing the received seismic data for providing at least one additional receiver line of extrapolated seismic data proximate to the plurality of receiver lines wherein processing the received data further comprises:
      (i) selecting at least one subset of seismic receivers along each of the plurality of seismic lines to define at least one space gate; and
      (ii) deriving at least one prediction filter using the received seismic data within the at least one space gate for predicting the received seismic data within said space gate, said prediction filter having a smaller size than the at least one space gate.

2. The method of claim 1 wherein the plurality of receivers on each receiver line communicate data to a processor by at least one of (i) a cable connecting the plurality of receivers on each receiver line, and (ii) telemetry.

3. The method of claim 1 further comprising applying said at least one prediction filter to at least a portion of the received data within said at least one space gate for providing at least one gate of data on the at least one additional receiver line.

4. The method of claim 1 further comprising applying said at least one prediction filter to at least a portion of the received data within said at least one space gate for providing at least one gate of data on the at least one additional receiver line.

5. The method of claim 1 wherein the at least one space gate comprises at least two space gates, the method further comprising combining the estimated data on the at least one additional line using a tapered weighting.

6. The method of claim 1 wherein the at least one additional receiver line further comprises at least one additional receiver line, the method further comprising processing the received seismic data and the estimated data on the at least one receiver line to give estimated data on the at least one additional receiver line.

7. The method of claim 1 wherein processing the received seismic data further comprises applying a Fast Fourier Transform to the received seismic data to give a plurality of frequency slices of the received seismic data.

8. The method of claim 7 wherein the at least one prediction filter comprises a plurality of prediction filters, each of said prediction filters corresponding to one of the plurality of frequency slices.

9. The method of claim 1 wherein deriving the at least one prediction filter further comprises using a modified covariance method.

10. A method of seismic prospecting comprising:
    (a) activating a seismic source to propagate seismic waves into the earths subsurface;
    (b) receiving reflections of the propagating seismic waves from at least one reflecting interface in the subsurface along a plurality of receiver lines, each receiver line including a plurality of seismic receivers, to give received seismic data along the plurality of receiver lines; and
    (c) processing the received seismic data for providing at least one additional receiver line of interpolated seismic data between two of the plurality of receiver lines;
    wherein the processing of the data further comprises:
       (i) defining a 3-D data volume wherein a first spatial dimension is the plurality of cables, a second spatial dimension is the plurality of seismic receivers, and the third dimension is time;
       (ii) zero-padding of the data in the 3-D data volume in the first and second spatial dimensions as well as in time to provide a zero-padded data volume;
       (iii) executing a masking operation to the zero-padded data volume to provide a zero-padded, zeromasked data volume;
       (iv) defining a transformed domain wherein a first transformed dimension is a wave number in the first spatial dimension, the second transformed dimension is a wavenumber in the second spatial dimension, and the third transformed dimension is frequency;
       (v) transforming the zero-padded data volume to produce a first transformed data volume in the transformed domain;
       (iv) transforming the zero-padded, zeromasked data set to produce a second transformed data volume in the transformed domain;
       (v) defining an interpolation operator in the transformed domain as a ratio of the first transformed data volume and the second transformed data volume and by keeping only the lower frequency components (by factor 1/L);
       (vi) inserting L-1 zero traces in each spatial dimension of the 3-D data volume to form a zero-inserted data volume;
       (vii) transforming the zero-inserted data volume to the transformed domain to give a transformed zero-inserted data volume;
       (viii) applying the interpolation operator to the transformed zero-inserted data volume to give a transformed interpolated data volume;
       (ix) inverse transforming the transformed interpolated data volume to give an interpolated data volume; and
       (x) discarding traces from the interpolated data volume in the second spatial dimension.

11. The method of claim 10 wherein L=2.

12. The method of claim 10 wherein the processing of the data further comprises:
    (i) sorting the data to obtain sorted data at at least one common receiver station location;
    (ii) transforming the sorted data at the at least one common receiver station location into a frequency-wavenumber domain to give transformed data;
    (iii) filtering the transformed data to obtain transformed filtered data; and
    (iv) transforming the transformed filtered data to a space-time domain.

13. The method of claim 10 wherein applying the interpolation operator further comprises band limiting along receiver wave-number axes.

* * * * *